US010907985B2

(12) United States Patent
Jin et al.

(10) Patent No.: US 10,907,985 B2
(45) Date of Patent: Feb. 2, 2021

(54) INFORMATION PROCESSING APPARATUS, INFORMATION PROCESSING METHOD, INFORMATION PROCESSING SYSTEM, AND NON-TRANSITORY STORAGE MEDIUM STORING PROGRAM

(71) Applicant: TOYOTA JIDOSHA KABUSHIKI KAISHA, Toyota (JP)

(72) Inventors: Xin Jin, Nagoya (JP); Miharu Hanai, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 235 days.

(21) Appl. No.: 16/120,187

(22) Filed: Aug. 31, 2018

(65) Prior Publication Data
US 2019/0113360 A1 Apr. 18, 2019

(30) Foreign Application Priority Data

Oct. 12, 2017 (JP) .................................. 2017-198365

(51) Int. Cl.
G01C 21/36 (2006.01)
G01C 21/34 (2006.01)
G06F 16/29 (2019.01)
H04L 29/08 (2006.01)

(52) U.S. Cl.
CPC ....... G01C 21/3661 (2013.01); G01C 21/343 (2013.01); G01C 21/3415 (2013.01); G01C 21/36 (2013.01); G06F 16/29 (2019.01); H04L 67/10 (2013.01)

(58) Field of Classification Search
CPC ............ G01C 21/3661; G01C 21/3415; G01C 21/343; G01C 21/36; G06F 16/29; H04L 67/10
See application file for complete search history.

(56) References Cited

U.S. PATENT DOCUMENTS

| 10,475,143 B1* | 11/2019 | Hayes | G06Q 30/0255 |
| 10,628,758 B2* | 4/2020 | Ikeda | G06Q 10/02 |
| 2009/0210148 A1* | 8/2009 | Jayanthi | H04W 4/024 701/467 |
| 2010/0063729 A1 | 3/2010 | Goto et al. | |
| 2015/0268057 A1* | 9/2015 | Tuukkanen | G01C 21/3438 701/516 |

(Continued)

FOREIGN PATENT DOCUMENTS

| JP | 2012-108932 A | 6/2012 |
| JP | 2015-121889 A | 7/2015 |
| JP | 2016-143232 A | 8/2016 |

Primary Examiner — Calvin Cheung
(74) Attorney, Agent, or Firm — Hunton Andrews Kurth LLP

(57) ABSTRACT

An information processing apparatus includes an acquisition unit configured to acquire first route information of a first departure place to a first destination, along which a first user moves, a selection unit configured to select at least one of a second departure place within a first predetermined range from the first departure place and a second destination within a second predetermined range from the first destination, and a sharing unit configured to enable sharing of second route information of at least one of the second departure place to the first destination and the first departure place to the second destination with a second user different from the first user.

10 Claims, 9 Drawing Sheets

(56) References Cited

U.S. PATENT DOCUMENTS

| | | | |
|---|---|---|---|
| 2016/0321566 A1* | 11/2016 | Liu | G06Q 10/02 |
| 2017/0167882 A1* | 6/2017 | Ulloa Paredes | G01C 21/3492 |
| 2017/0169366 A1* | 6/2017 | Klein | G06Q 50/30 |
| 2017/0284818 A1* | 10/2017 | Boss | G01C 21/3438 |
| 2017/0328732 A1* | 11/2017 | Vandanapu | G01C 21/3697 |

* cited by examiner

FIG. 8

| FACILITY ID | POSITION (LATITUDE AND LONGITUDE) | TYPE | PRESENCE OR ABSENCE OF PARKING LOT | LINK ID OF PARKING LOT EXIT | BUSINESS HOURS | INITIAL SCORE |
|---|---|---|---|---|---|---|
| 0001 | POSITION A | PARK | PRESENT | L0001 | - | 26 |
| 0002 | POSITION B | SHOPPING CENTER | PRESENT | L0015 | 10:00 – 22:00 | 50 |
| 0003 | POSITION C | SCHOOL | ABSENT | - | - | 19 |
| ... | ... | ... | ... | ... | ... | ... |

211

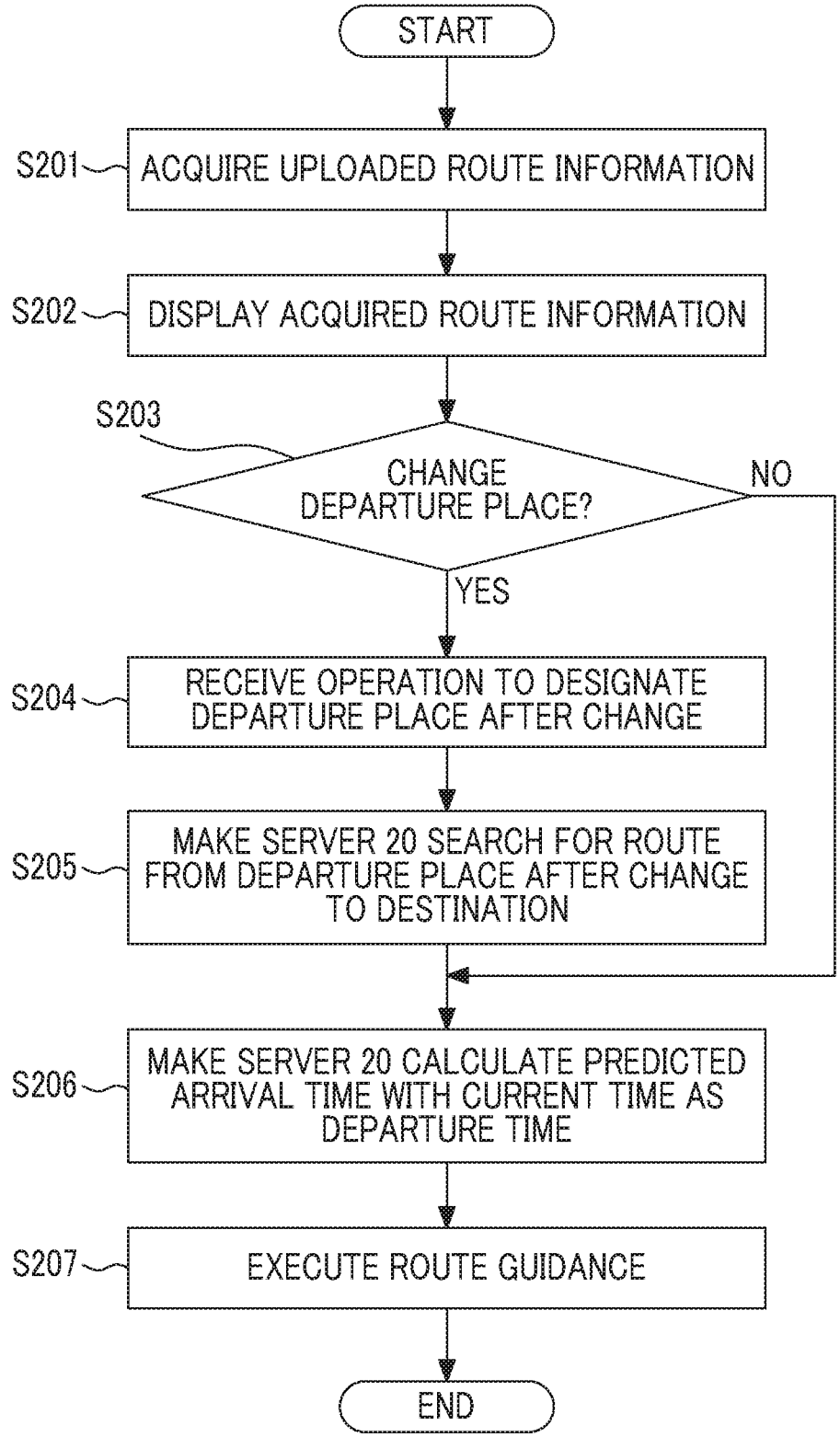

INFORMATION PROCESSING APPARATUS, INFORMATION PROCESSING METHOD, INFORMATION PROCESSING SYSTEM, AND NON-TRANSITORY STORAGE MEDIUM STORING PROGRAM

INCORPORATION BY REFERENCE

The disclosure of Japanese Patent Application No. 2017-198365 filed on Oct. 12, 2017 including the specification, drawings and abstract is incorporated herein by reference in its entirety.

BACKGROUND

1. Technical Field

The present disclosure relates to an information processing apparatus, an information processing method, an information processing system, and a non-transitory storage medium storing a program.

2. Description of Related Art

In a communication terminal (hereinafter, referred to as a "terminal"), such as a smartphone, a technique that searches for a route from a departure place to a destination and notifies another user of the searched route is known.

Japanese Unexamined Patent Application Publication No. 2012-108932 (JP 2012-108932 A) discloses a technique that, in a navigation system, suppresses transmission of positional information near a place where an individual can be specified, such as a home position of a vehicle driver, in order to restrain leakage of information capable of specifying an individual in origin and destination (OD) investigation.

SUMMARY

In the related art, in a route other than a place capable of specifying an individual, such as a home position, the entire route from the departure place to the destination may be shared with another user, but the user may not desire to share the route.

The disclosure provides a technique capable of enabling sharing of route information of a departure place to a destination with another user without allowing another user to know a combination of the departure place and the destination.

A first aspect of the disclosure relates to an information processing apparatus. The information processing apparatus includes an acquisition unit, a selection unit, and a sharing unit. The acquisition unit is configured to acquire first route information of a first departure place to a first destination, along which a first user moves. The selection unit is configured to select at least one of a second departure place within a first predetermined range from the first departure place and a second destination within a second predetermined range from the first destination. The sharing unit is configured to enable sharing of second route information of at least one of the second departure place to the first destination and the first departure place to the second destination with a second user different from the first user.

For this reason, in a case where the departure place or the destination is a position where an individual can be specified, such as a home position, it is possible to enable sharing of a route having a position other than the position where an individual can be specified, such as a home position, as a departure place or a destination.

Accordingly, even in a case where the departure place or the destination is the position where an individual can be specified, such as a home position, it is possible to enable sharing of the route information of the departure place to the destination with another user. Furthermore, it is possible to enable sharing of the route information of the departure place to the destination with another user without allowing another user to know a combination of the departure place and the destination.

In the information processing apparatus according to the first aspect of the disclosure, the selection unit may be configured to execute at least one of selecting a facility within the first predetermined range from the first departure place as the second departure place and selecting a facility within the second predetermined range from the first destination as the second destination.

For this reason, it is possible to enable sharing of a route having a facility around an original position as a departure place or a destination.

Accordingly, it is possible to enable sharing of the route information of the departure place to the destination with another user without allowing another user to know a combination of the departure place and the destination.

In the information processing apparatus according to the first aspect of the disclosure, the selection unit may be configured to execute at least one of selecting a facility along a principal road among at least one facility within the first predetermined range from the first departure place as the second departure place with priority and selecting a facility along a principal road among at least one facility within the second predetermined range from the first destination as the second destination with priority.

For this reason, in a case where the departure place or the destination is a position where an individual can be specified, such as a home position, it is possible to enable sharing of a route having a facility along a principal road among facilities within a predetermined range from a position where an individual can be specified, such as a home position, as a departure place or a destination with priority.

Accordingly, it is possible to enable sharing of a route having a position easier to understand as a departure place or a destination with another user while protecting information capable of specifying an individual, such as a home position.

In the information processing apparatus according to the first aspect of the disclosure, the sharing unit may be configured to include, in the second route information, at least one of (i) a departure time of the second departure place calculated according to an arrival time of the first destination included in the first route information and (ii) an arrival time of the second destination calculated according to a departure time of the first departure place included in the first route information.

For this reason, it is possible to set a departure time or an arrival time according to a changed departure place or destination.

Accordingly, it is possible to enable sharing of route information of a departure place to a destination having appropriate departure time and arrival time with another user.

In the information processing apparatus according to the first aspect of the disclosure, the sharing unit may be configured to, in a case where sharing of the first route information is permitted by the first user, set the first route information to be usable to the second user. The sharing unit may be configured to, in a case where sharing of the first route information is not permitted by the first user, enable sharing of the second route information with the second user.

For this reason, in a case where the departure place or the destination is a position where an individual can be specified, such as a home position, it is possible to allow a user to select whether or not to change and enable sharing of a departure place or a destination.

Accordingly, it is possible to enable sharing of the route information of the departure place to the destination with another user without allowing another user to know a combination of the departure place and the destination.

In the information processing apparatus according to the first aspect of the disclosure, the sharing unit may be configured to enable sharing of the second route information with the second user selected by the first user.

For this reason, it is possible to allow a user as a sharing source to select a user as a sharing destination who shares a route.

Accordingly, it is possible to enable sharing a route from a departure place to a destination with another user, such as a friend.

In the information processing apparatus according to the first aspect of the disclosure, the sharing unit may be configured to make the second route information be shared between the first user and the second user using a social networking service.

For this reason, it is possible to enable sharing of a route through a social networking service.

Accordingly, it is possible to enable sharing of a route from a departure place to a destination with another user, such as a friend on a social networking service.

In the information processing apparatus according to the first aspect of the disclosure, the sharing unit may be configured to change at least one of the second departure place and the second destination included in the second route information to a position according to the second user and enable sharing of the position with the second user.

For this reason, it is possible to change a departure place or a destination to a position according to another user, and to enable sharing of route information of a departure place to a destination.

Accordingly, it is possible to allow another user to use route information of a departure place to a destination having home or the like of another user as a departure place or a destination.

A second aspect of the disclosure relates to an information processing method. The information processing method includes, by an information processing system, acquiring first route information of a first departure place to a first destination, along which a first user moves, selecting at least one of a second departure place within a first predetermined range from the first departure place and a second destination within a second predetermined range from the first destination, and enabling sharing of second route information of at least one of the second departure place to the first destination and the first departure place to the second destination with a second user different from the first user.

For this reason, in a case where the departure place or the destination is a position where an individual can be specified, such as a home position, it is possible to enable sharing of a route having a position other than the position where an individual can be specified, such as a home position, as a departure place or a destination.

Accordingly, it is possible to enable sharing of the route information of the departure place to the destination with another user without allowing another user to know a combination of the departure place and the destination.

A third aspect of the disclosure relates to an information processing system. The information processing system includes a first terminal, an information processing apparatus, and a second terminal. The first terminal is configured to transmit first route information of a first departure place to a first destination, along which a first user moves, to an information processing apparatus. The information processing apparatus includes an acquisition unit, a selection unit, and a sharing unit. The acquisition unit is configured to acquire first route information of the first departure place to the first destination, along which the first user moves. The selection unit is configured to select at least one of a second departure place within a first predetermined range from the first departure place and a second destination within a second predetermined range from the first destination. The sharing unit is configured to enable sharing of second route information of at least one of the second departure place to the first destination and the first departure place to the second destination with a second user different from the first user. The second terminal is configured to acquire the second route information.

For this reason, in a case where the departure place or the destination is a position where an individual can be specified, such as a home position, it is possible to enable sharing of a route having a position other than the position where an individual can be specified, such as a home position, as a departure place or a destination.

Accordingly, it is possible to enable sharing of the route information of the departure place to the destination with another user without allowing another user to know a combination of the departure place and the destination.

A fourth aspect of the disclosure relates to a non-transitory storage medium storing a program. The program causes an information processing system to execute acquiring first route information of a first departure place to a first destination, along which a first user moves, selecting at least one of a second departure place within a first predetermined range from the first departure place and a second destination within a second predetermined range from the first destination, and enabling sharing of second route information of at least one of the second departure place to the first destination and the first departure place to the second destination with a second user different from the first user.

For this reason, in a case where the departure place or the destination is a position where an individual can be specified, such as a home position, it is possible to enable sharing of a route having a position other than the position where an individual can be specified, such as a home position, as a departure place or a destination.

Accordingly, it is possible to enable sharing of the route information of the departure place to the destination with another user without allowing another user to know a combination of the departure place and the destination.

It is possible to enable sharing of the route information of the departure place to the destination with another user without allowing another user to know a combination of the departure place and the destination.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a diagram showing an example of facility data; and

FIG. 9 is a flowchart showing an example of processing using route information.

DETAILED DESCRIPTION OF EMBODIMENTS

Figure 1:
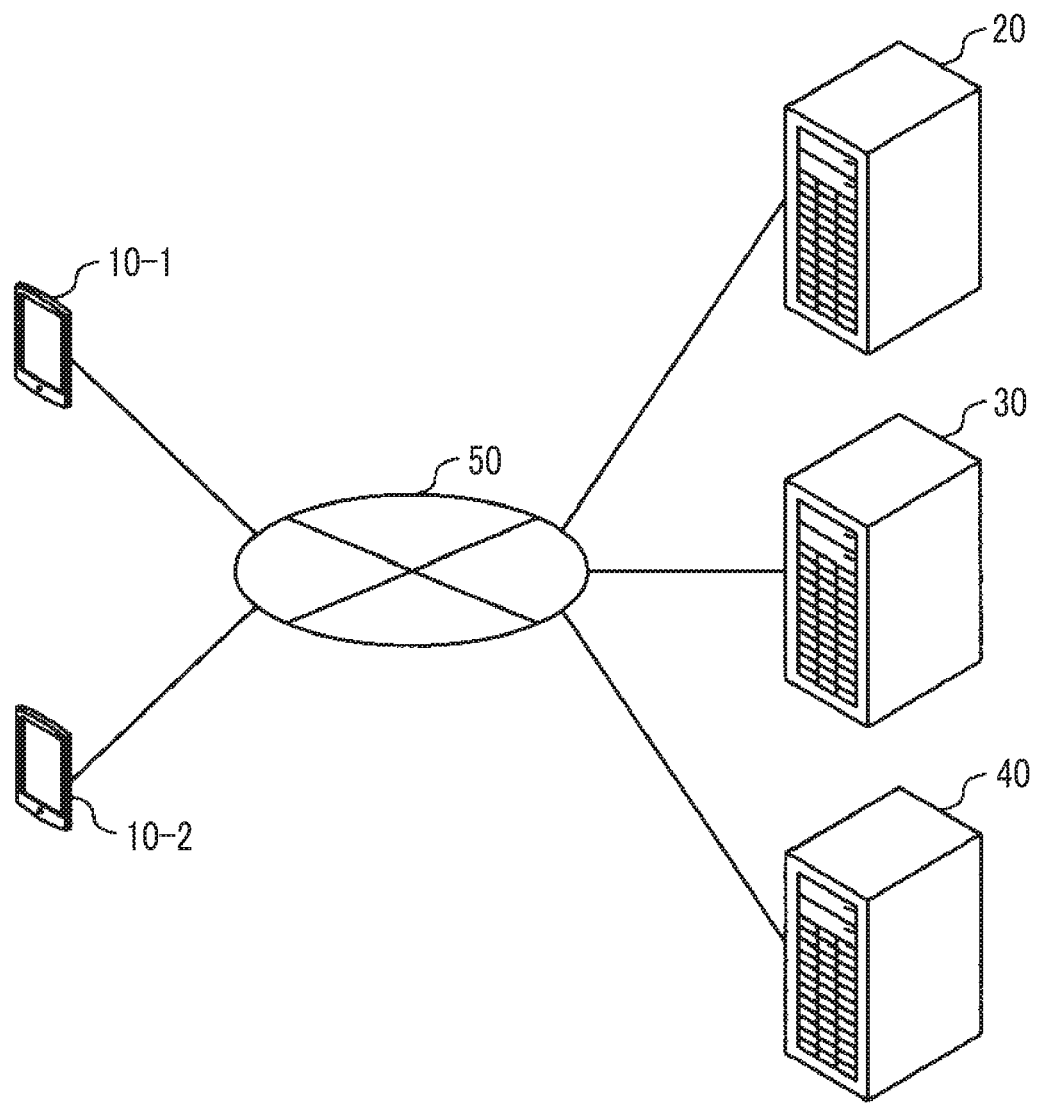
FIG. 1 is a diagram showing a configuration example of a communication system according to an embodiment.

Hereinafter, an embodiment of the disclosure will be described referring to the drawings.

System Configuration

FIG. 1 is a diagram showing a configuration example of a communication system 1 according to an embodiment. In FIG. 1, the communication system 1 has terminals 10-1, 10-2 (hereinafter, in a case where there is no need for distinction from each other, simply referred to as "terminals 10"), a server 20, an SNS server 30, and a content providing server 40. The number of terminals 10 is not limited to two.

The terminals 10 and the server 20, and the terminals 10 and the SNS server 30 are connected in a communicable state, for example, through a network 50, such as the Internet, a mobile phone network, a wireless local area network (LAN), or a LAN.

The server 20 and the content providing server 40 are connected in a communicable state through the network 50.

Each terminal 10 is, for example, an information processing apparatus (computer), such as a smartphone, a tablet personal computer (PC), a notebook PC, or a navigation device.

The terminal 10 acquires data of a map or a route from the server 20 using an application for route guidance (navigation), and performs navigation of moving using a vehicle, walking, a train, or the like. The terminal 10 transmits (uploads) information (route information) regarding a route, along which the user moves, a route, along which the user is moving, or a route, along which the user is scheduled to move, to the server 20 according to a user's operation. The route information includes, for example, information regarding a moving route from a departure place to a destination, or the like. The route information may include a via-point, a departure time, an arrival time, and a pin, a comment, an image, or the like associated with a position on the route. The terminal 10 performs chat, image sharing, and the like with a group of friends or the like using a social networking service (SNS) provided by the SNS server 30.

The server 20 is, for example, an information processing apparatus for a server, and provides a service, such as navigation, to the terminal 10. The server 20 shares the route information uploaded from the terminal 10 with users of other terminals 10 through the SNS server 30. The server 20 may share the route information uploaded from the terminal 10 with users of other terminals 10 not through the SNS server 30.

The SNS server 30 is, for example, an information processing apparatus for a server, and provides a social networking service, such as group chat, to the terminal 10. The SNS server 30 transmits the route information uploaded from the terminal 10 through the server 20 to other terminals 10 using the social networking service. The SNS server 30 may transmit the route information to other terminals 10 using social media including Wiki, SNS, a blog, an image sharing site, and the like.

The content providing server 40 is, for example, an information processing apparatus for a server, and provides data, such as business hours of facilities, to the server 20.

Hardware Configuration

Figure 2:
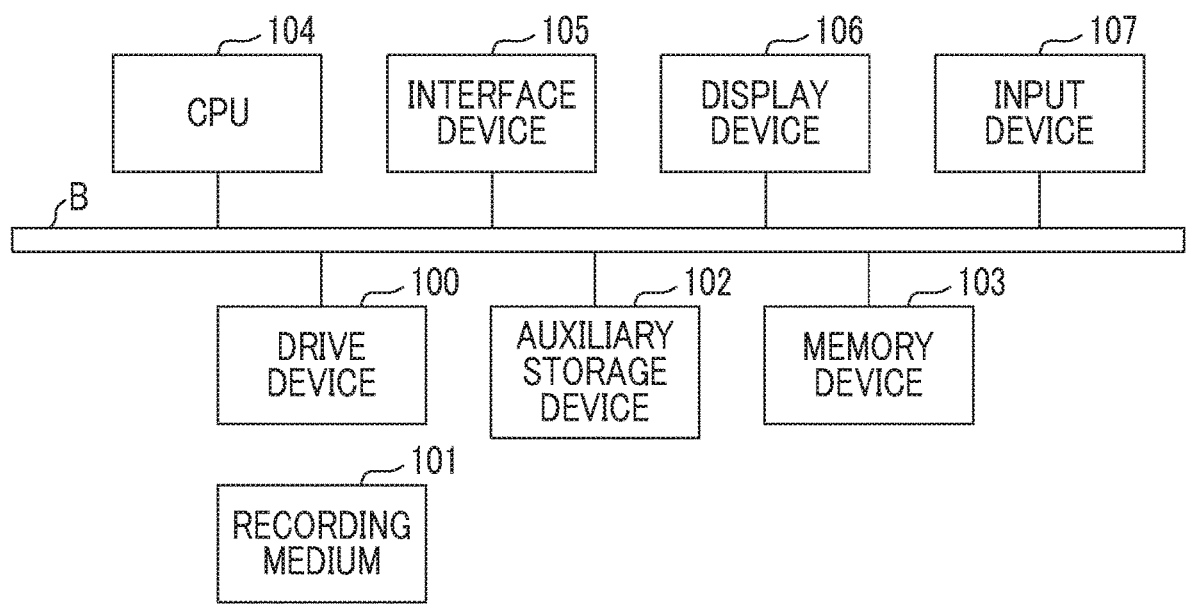
FIG. 2 is a diagram showing a hardware configuration example of a server according to the embodiment.

FIG. 2 is a diagram showing a hardware configuration example of the server 20 according to the embodiment. The server 20 of FIG. 2 has a drive device 100, an auxiliary storage device 102, a memory device 103, a central processing unit (CPU) 104, an interface device 105, and the like connected to one another through a bus B.

An information processing program that realizes processing in the server 20 is provided, for example, by a recording medium 101. In a case where the recording medium 101 having the information processing program recorded thereon is set in the drive device 100, the information processing program is installed from the recording medium 101 to the auxiliary storage device 102 through the drive device 100. However, the installation of the information processing program is not indispensably performed from the recording medium 101, and may be downloaded from another computer through the network. The auxiliary storage device 102 stores the installed information processing program, and stores needed files, data, and the like.

The memory device 103 is, for example, a random access memory (RAM), and in a case where there is a start instruction of the program, reads and stores the program from the auxiliary storage device 102. The CPU 104 realizes functions related to the server 20 according to the program stored in the memory device 103. The interface device 105 is used as an interface for connection to the network.

As an example of the recording medium 101, a portable recording medium, such as a compact disk-read only memory (CD-ROM), a digital versatile disc (DVD) disk, or a universal serial bus (USB) memory, is exemplified. As an example of the auxiliary storage device 102, a hard disk drive (HDD), a flash memory, or the like is exemplified. Both of the recording medium 101 and the auxiliary storage device 102 correspond to a computer-readable recording medium.

The hardware configurations of the terminal 10, the SNS server 30, and the content providing server 40 may be the same as that of the server 20.

Functional Configuration

Figure 3:
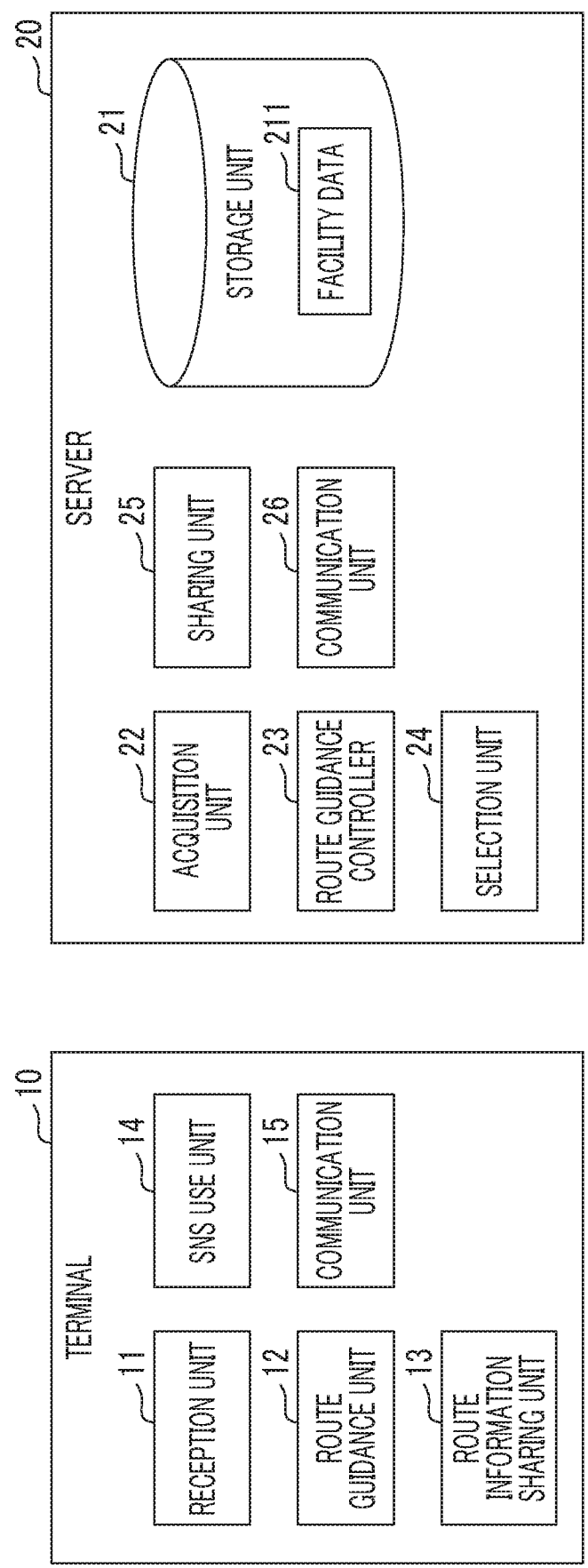
FIG. 3 is a diagram showing an example of a functional block diagram of a terminal and a server according to the embodiment.

The functional configurations of the terminal 10 and the server 20 according to the embodiment will be described referring to FIG. 3. FIG. 3 is a diagram showing an example of a functional block diagram of the terminal 10 and the server 20 according to the embodiment.

Server 20

The server 20 has a storage unit 21. The storage unit 21 is realized using, for example, an auxiliary storage device or the like. The storage unit 21 stores facility data 211 and the like. Data stored in the facility data 211 will be described below.

The server 20 has an acquisition unit 22, a route guidance controller 23, a selection unit 24, a sharing unit 25, and a communication unit 26. The acquisition unit 22, the route guidance controller 23, the selection unit 24, the sharing unit 25, and the communication unit 26 represent functions that are realized by processing executed on the CPU 104 of the server 20 by one or more programs installed on the server 20.

The acquisition unit 22 acquires a departure place, a via-point, a destination, and the like designated by the user from the terminal 10. The acquisition unit 22 acquires route information from a departure place to a destination, along which the user moves, from the terminal 10 or the route guidance controller 23.

The route guidance controller 23 searches for a moving route from the departure place to the destination and makes the terminal 10 perform route guidance using the moving route. With this, a service of navigation is provided to the user through the terminal 10.

The selection unit 24 selects a principal facility within a predetermined range from the departure place or the destination acquired by the acquisition unit 22. With this, when the route information is shared, in a case where user's home or the like is the departure place or the destination, and a position selected by the selection unit 24 other than home or the like is set as the departure place or the destination.

The sharing unit 25 allows route information of one user acquired by the acquisition unit 22 to be shared with other users. The sharing unit 25 makes the route information be shared with other users using the social networking service provided by the SNS server 30, for example.

The communication unit 26 performs communication with the terminal 10, the SNS server 30, and the content providing server 40. The communication unit 26 receives a route search request, a route sharing request, and the like from the terminal 10. The communication unit 26 transmits the route information to the SNS server 30 according to an instruction from the sharing unit 25.

Terminal 10

The terminal 10 has a reception unit 11, a route guidance unit 12, a route information sharing unit 13, an SNS use unit 14, and a communication unit 15. The above-described units represent functions that are realized by processing executed on the CPU 104 of the terminal 10 by one or more programs installed on the terminal 10.

The reception unit 11 receives an input operation from the user. The reception unit 11 receives an input of a departure place, a via-point, a destination, and the like, for example, in searching for route information.

The route guidance unit 12 performs route guidance using the route information received from the server 20. For example, the route guidance unit 12 may perform route guidance for a vehicle or may perform route guidance for walking.

The route information sharing unit 13 shares the route information used by the user of the terminal 10 with other terminals 10 using the server 20. For example, the route information sharing unit 13 acquires the route information from the server 20 or the SNS server 30. For example, the route information sharing unit 13 uploads the route information to the server 20.

The SNS use unit 14 performs chat, image sharing, and the like with a group including the users of other terminals 10 using the SNS server 30. In a case where an image of the route information shared through the SNS is selected by the user, the SNS use unit 14 can edit the selected route information by the route information sharing unit 13.

The communication unit 15 performs communication with the server 20 and the SNS server 30. For example, the communication unit 15 transmits a route search request, a route sharing request, and the like to the server 20.

Processing

Figure 4:
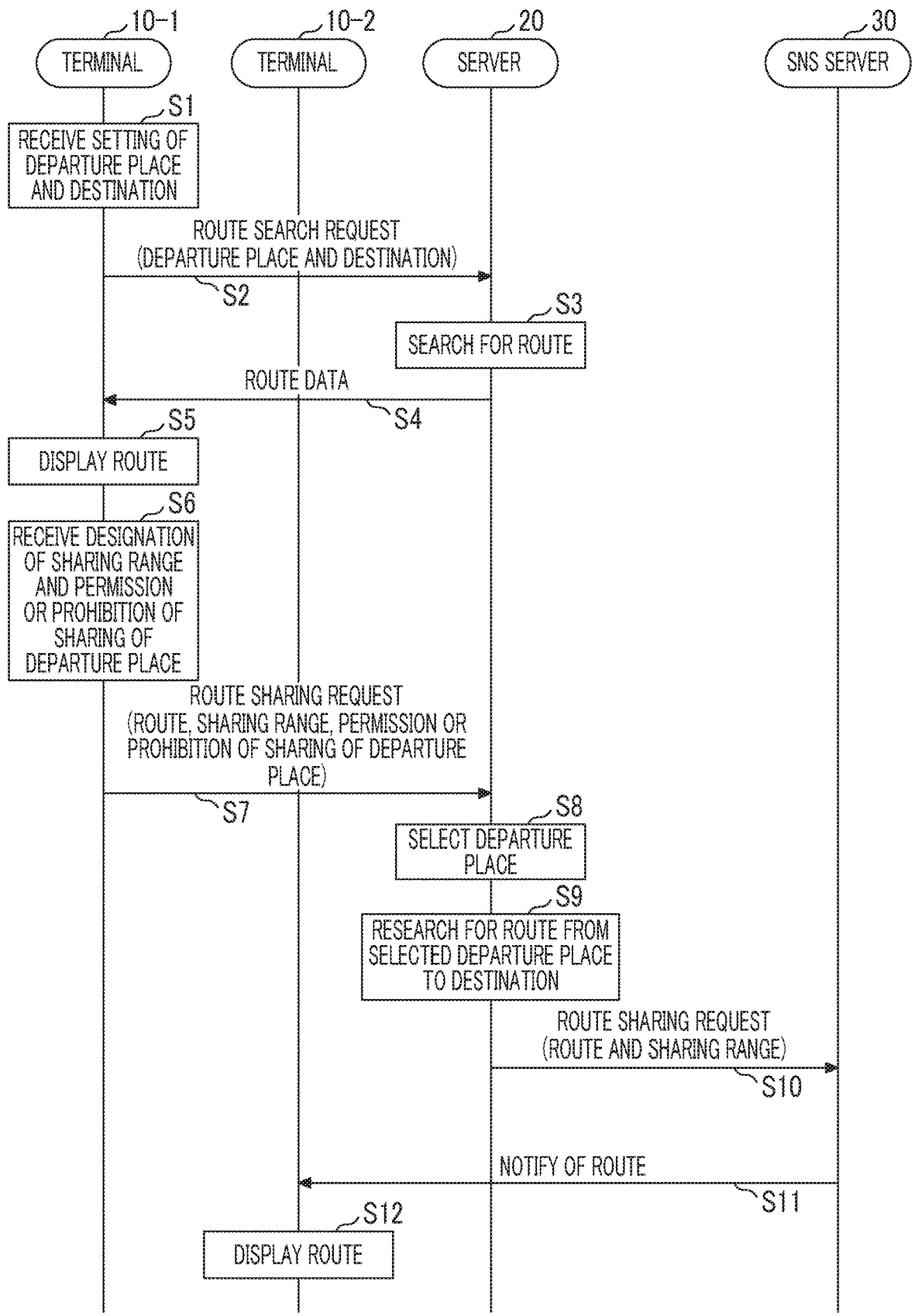
FIG. 4 is a sequence diagram showing an example of processing of the communication system according to the embodiment.

Processing of the communication system 1 according to the embodiment will be described referring to FIGS. 4 to 6. FIG. 4 is a sequence diagram showing an example of the processing of the communication system 1 according to the embodiment. FIGS. 5A to 5C are diagrams illustrating an example of a display screen of the terminal 10-1 as a sharing source. FIG. 6 is a diagram illustrating an example of a display screen of the terminal 10-2 as a sharing destination.

Hereinafter, although an example where a route having home or the like as a departure place is shared with the departure place changed will be described, a route having home or the like as a destination can be shared with the destination changed in the same manner as described below. In this case, in the following description, in Step S8, the selection unit 24 of the server 20 may select a second destination within a predetermined range from the destination included in the route information acquired by the acquisition unit 22, and in Step S9, the route guidance controller 23 may research for a route from the departure place to the second destination.

In Step S1, the reception unit 11 of the terminal 10-1 of the user ("first user") as a sharing source of the route information receives setting of a departure place ("first departure place") and a destination ("first destination") from the user. Here, the reception unit 11 of the terminal 10-1 may receive setting of one or more via-points.

Subsequently, the route guidance unit 12 of the terminal 10-1 transmits a route search request including setting data, such as the departure place, to the server 20 (Step S2).

Subsequently, the route guidance controller 23 of the server 20 searches for a route (moving route or route) from the departure place to the destination (Step S3), and transmits the searched route to the terminal 10-1 (Step S4).

Subsequently, the route guidance unit 12 of the terminal 10-1 displays the route received from the server 20 (Step S5). Subsequently, the route information sharing unit 13 of the terminal 10-1 receives an operation to designate route information ("first route information") to be shared, a range of users sharing the route information, and the permission or prohibition of the departure place from the user (Step S6).

Figure 5A:
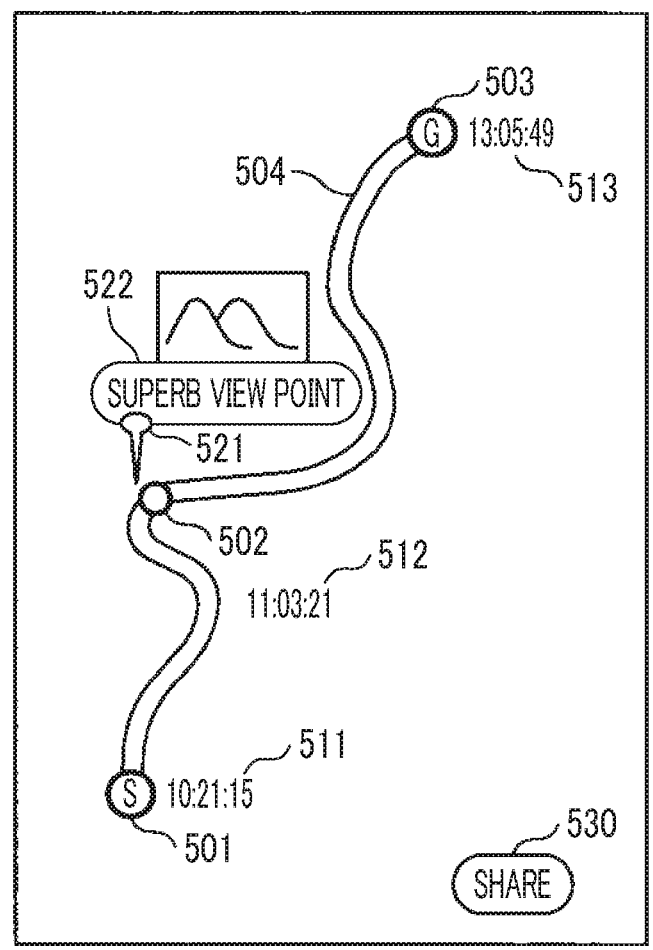
FIG. 5A is a diagram illustrating an example of a display screen of a terminal as a sharing source.
Figure 5B:
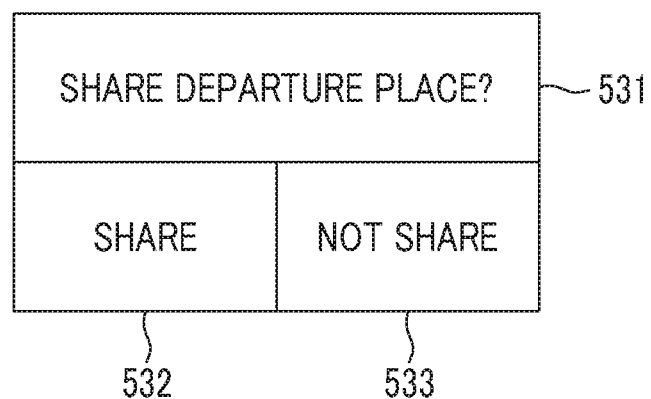
FIG. 5B is a diagram illustrating an example of a display screen of a terminal as a sharing source.
Figure 6:
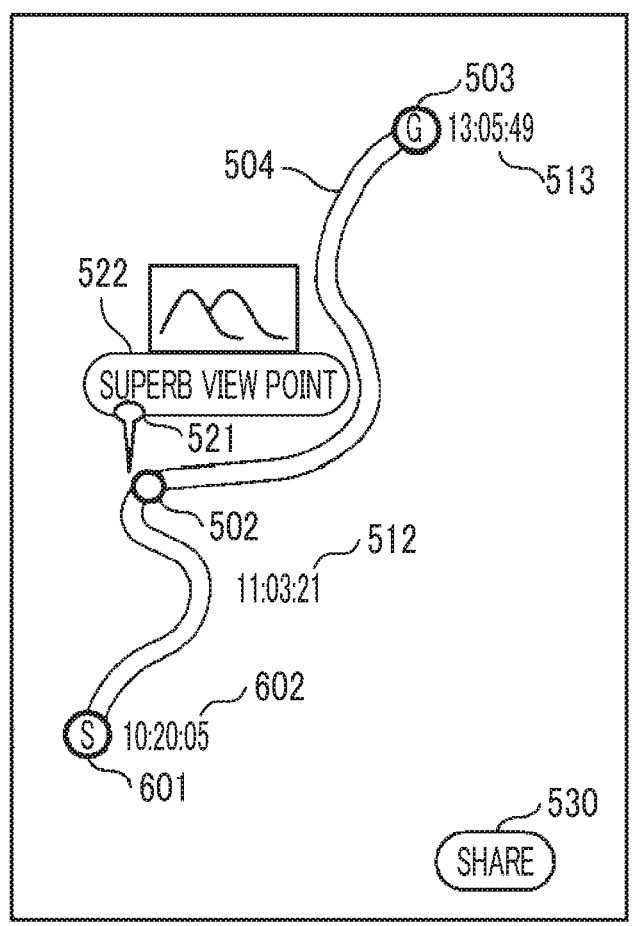
FIG. 6 is a diagram illustrating an example of a display screen of a terminal as a sharing destination.

FIG. 5A is a diagram showing a display example of route information to be shared. FIG. 5A shows an example of route information after the user of the terminal 10-1 actually moves from a departure place to a destination during a trip or the like. In the example of FIG. 5A, a route 504 from a departure place 501 to a destination 503 by way of a via-point 502, a time 511 for departure or scheduled for departure from the departure place 501, a time 512 for passing through or scheduled for passing through the via-point 502, a time 513 for arrival or scheduled for arrival at the destination 503, a pin 521, a comment 522, an image 523, and a share button 530 are displayed. The pin 521, the comment 522, and the image 523 are information indicating a position, a comment of the user relating to the position, and an image relating to the position input by the user of the terminal 10-1, or the like before, during, or after moving from the departure place to the destination. On the screen of FIG. 5A, in a case where the share button 530 is depressed, a dialog of FIG. 5B is displayed. In the example of FIG. 5B, a message 531 "share departure place?", a button 532 "share", and a button 533 "not share" are displayed. Here, in a case where the button 532 "share" is depressed by the user, the departure place is not changed, and the route information is shared. In a case where the button 533 "not share" is depressed by the user, after the departure place is changed from the first departure place to a second departure place, the route information is shared. Hereinafter, a case where the button 533 "not share" is depressed by the user will be described.

Figure 5C:
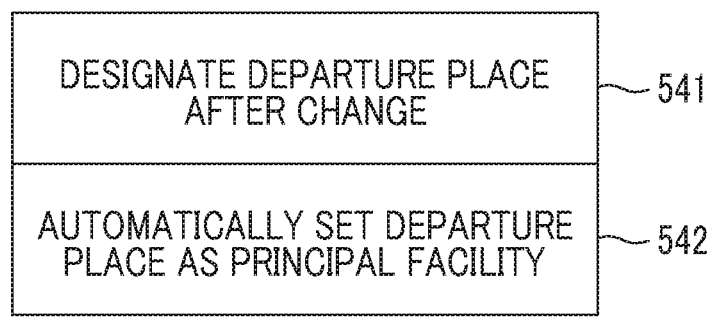
FIG. 5C is a diagram illustrating an example of a display screen of a terminal as a sharing source.

In a case where the button 533 "not share" is depressed by the user, a dialog shown in FIG. 5C may be displayed. In the example of FIG. 5C, a button 541 "designate departure place after change" and a button 542 "automatically set departure place as principal facility" are displayed. In a case where the button 541 "designate departure place after change" is depressed by the user, the user can manually select the second departure place. In a case where the button 542 "automatically set departure place as principal facility" is depressed by the user, the second departure place is automatically selected. Hereinafter, a case where the button 542 "automatically set departure place as principal facility" is depressed by the user will be described.

Here, the route information sharing unit 13 of the terminal 10-1 receives designation of an identification (ID) of each user included in a group sharing the route information as the range of users sharing the route information. Furthermore, the route information sharing unit 13 of the terminal 10-1 may receive designation of a talk room (chat room) of the group sharing the route information in the SNS server 30.

Subsequently, the route information sharing unit 13 of the terminal 10-1 transmits a route sharing request including data of the route information, the range, and the permission or prohibition of sharing of the departure place to the server 20 (Step S7).

Subsequently, in a case where sharing of the departure place is rejected, the selection unit 24 of the server 20 selects the second departure place within the predetermined range from the departure place included in the route information acquired by the acquisition unit 22 (Step S8).

Subsequently, the route guidance controller 23 of the server 20 researches for a route from the second departure place selected by the selection unit 24 to the destination (Step S9). Here, the route guidance controller 23 of the server 20 changes the departure time without changing the arrival time at the destination included in the route information. With this, for example, in a case where the route information is shared with friends or the like before arrival at the destination, the original predicted arrival time can be shared, making it easy to join the friends or the like at the destination. In a case where the route information is shared after arrival at the destination, it is possible to suppress time inconsistency even though a passing time at a via-point, an imaging time of an image, or the like is not changed.

In a case where the destination is home or the like, and the destination is changed, the route guidance controller 23 of the server 20 changes the arrival time without changing the departure time from the departure place included in the route information.

Subsequently, the sharing unit 25 of the server 20 transmits route information ("second route information") including the researched route and a range of users sharing the route information to the SNS server 30 (Step S10). Here, the sharing unit 25 of the server 20 may convert the ID of each user included in the group sharing the route received in Step S6 to the ID of each user managed on the SNS server 30 and transmit the ID of each user managed on the SNS server 30 as the range of users sharing the route information. In this case, a correspondence table of the ID of the user managed on the server 20 and the ID of the user managed on the SNS server 30 may be set in the server 20 in advance.

Subsequently, the SNS server 30 transmits the received route information of the terminal 10-2 of each user included in the group sharing the route (Step S11).

Subsequently, the SNS use unit 14 of the terminal 10-2 of the user ("second user") as a sharing destination displays the route information received from the SNS server 30 on a talk room screen of the group designated from the user of the terminal 10-1 (Step S12). In the example of FIG. 6, a position of a departure place 601 is changed from the position of the departure place 501 of FIG. 5A compared to FIG. 5A. A departure time 602 is also changed with the change of the departure place. Here, even in a case where a map is displayed on an enlarged scale on the terminal 10-2, the departure place 501 that is home or the like of the user of the terminal 10-1 is changed to the second departure place 601 that is a principal facility around the departure place 501; thus, it is possible to share a route used or being used by the user of the terminal 10-1 with the user of the terminal 10-2 while protecting personal information relating to the home position of the user of the terminal 10-1.

The route information sharing unit 13 of the terminal 10-2 performs edition, such as addition or deletion, of a pin, a comment, an image, and the like associated with a position on the route in the shared route information according to an operation from the user. In this case, the route information sharing unit 13 of the terminal 10-2 can upload the edited route information to the server 20 and can allow the route information to be shared with the terminal 10-1. The route information sharing unit 13 of the terminal 10 may directly upload the route information to the SNS server 30 instead of uploading the route information to the SNS server 30 through the server 20.

Selection Processing of Second Departure Place

Figure 7:
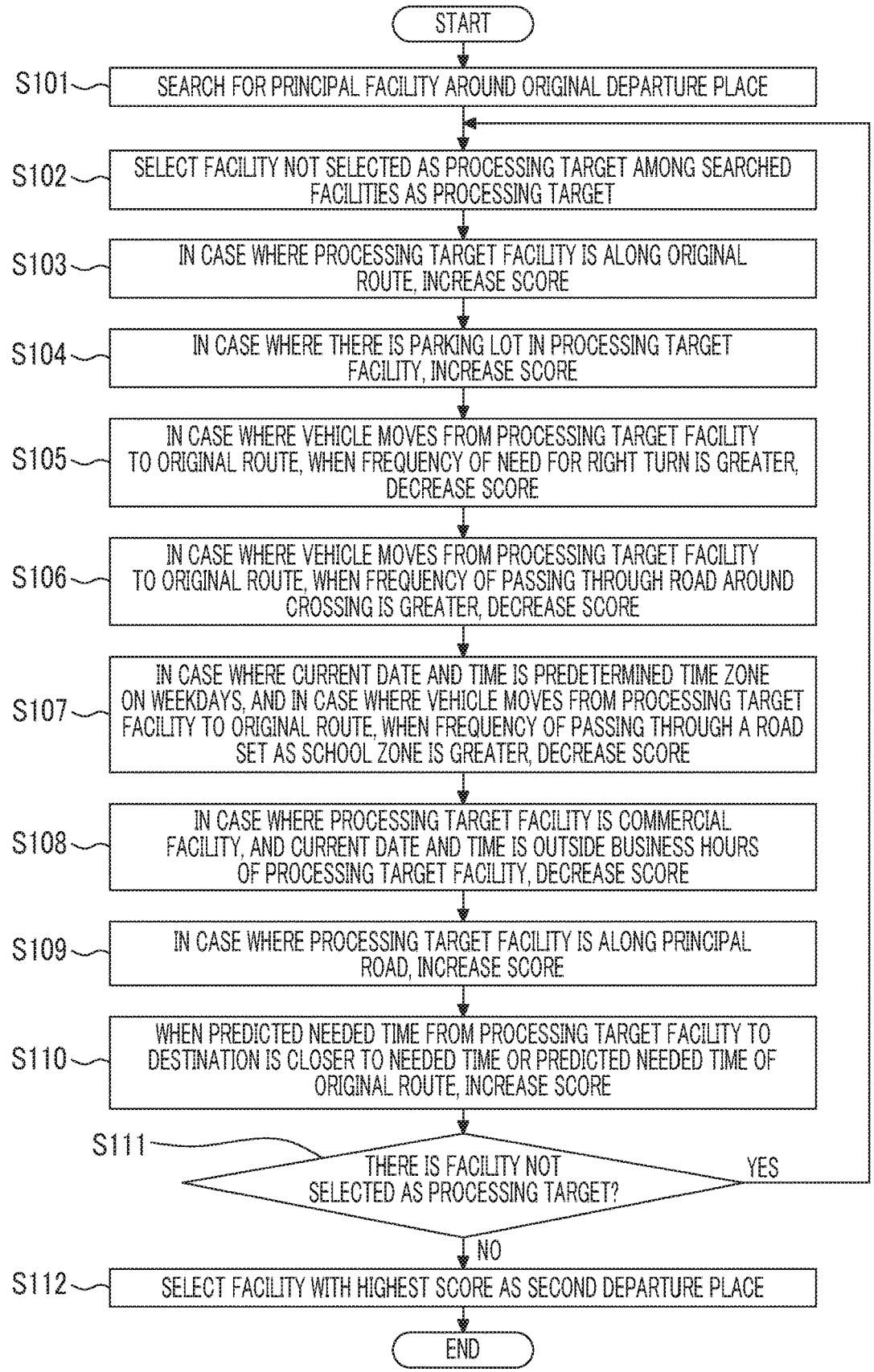
FIG. 7 is a flowchart showing an example of processing for selecting a second departure place.

The processing for selecting the second departure place in the selection unit 24 of the server 20 in Step S8 will be described referring to FIGS. 7 and 8. FIG. 7 is a flowchart showing an example of processing for selecting the second departure place. FIG. 8 is a diagram showing an example of facility data 211.

Hereinafter, although an example of changing a departure place will be described, a destination can be changed in the same manner as described below. In this case, in the following description, a "departure place" and a "destination" may be appropriately replaced with each other.

In Step S101, the selection unit 24 refers to facility data 211 and searches for a principal facility (Point Of Interest (POI)) around the above-described first departure place (hereinafter, referred to as an "original departure place"). Here, a principal facility is, for example, a public facility, such as a station, a park, or a school, a commercial facility, such as a convenience store, a supermarket, a department store, or a shopping center, or the like.

In facility data 211, items of a facility ID, a facility name, a position, a type, the presence or absence of a parking lot, a link ID of a parking lot exit, business hours, and an initial score are recorded. The facility ID is identification information of a facility. The facility name is a name of a facility. The position is a position of a facility indicated by a latitude, a longitude, and the like. The type is a type of a facility. The presence or absence of the parking lot is information indicating whether or not a facility is provided with a parking lot available by a general user. The link ID of the parking lot exit is identification information of a road that is connected to an exit of a parking lot of a facility. The business hours are business hours of a facility. The initial score is an initial value of a score set in advance. The server 20 may acquire and store at least a part of data included in facility data 211 from the content providing server 40.

Here, for example, the selection unit 24 may search for a facility within a predetermined range (for example, radius 500 m) from the departure place. In a case where the departure place is a province, or the like, and in a case where there is no facility within the predetermined range from the departure place, the selection unit 24 may expand the predetermined range such that a plurality of facilities is searched.

Subsequently, the selection unit 24 selects, as a processing target, one facility not selected as a processing target among the facilities searched in Step S101 (Step S102). Hereinafter, the facility selected as a processing target is referred to as a "processing target facility".

Subsequently, in a case where the processing target facility is along a route (hereinafter, referred to as an "original route) from the original departure place to the destination, the selection unit 24 increases a score to the processing target facility (Step S103). Here, the selection unit 24 increases the score, for example, by adding a predetermined value to the initial value of the score in facility data 211.

Subsequently, the selection unit 24 refers to the presence or absence of the parking lot of facility data 211, and in a case where there is an available parking lot in the processing target facility, increases the score to the processing target facility (Step S104).

Subsequently, the selection unit 24 decreases the score to the processing target facility vehicle when a frequency of a need for right turn is greater in a case where the vehicle moves from the processing target facility to the original route (Step S105). With this, for example, since a facility along a lane on the route has the score to the processing target facility higher than a facility along an oncoming lane on the original route, the facility along the lane on the route can be thus easily selected as a departure place.

In the original route, a principal road, such as a road having a comparatively wide road width (width), a prefectural road, or a national road, is easily selected. With this, a facility comparatively along a principal road can be easily selected as a departure place.

Subsequently, the selection unit 24 decreases the score to the processing target facility when a frequency of passing through a road within a predetermined range from a crossing of a roadway is greater in a case where the vehicle moves from the processing target facility to the original route (Step S106).

Subsequently, in a case where the current date and time is a predetermined time zone (for example, a time zone of no vehicle in a school zone) on weekdays, the selection unit 24 decreases the score to the processing target facility when a frequency of passing through a road set as a school zone is greater in a case where the vehicle moves from the processing target facility to the original route (Step S107). With this, a user who uses a shared route can hardly select a departure place that makes the vehicle travels in the school zone.

Subsequently, the selection unit 24 refers to facility data 211, and in a case where the processing target facility is a commercial facility and the current date and time is outside business hours of the processing target facility, decreases the score to the processing target facility (Step S108). With this, for example, a departure place that is hardly marked since lights are put out due to outside business hours or where a parking lot or the like is not available due to outside business hours can be hardly selected.

Subsequently, in a case where the processing target facility is along a principal road, the selection unit 24 increases the score to the processing target facility (Step S109). With this, since a facility along a principal road is selected with priority, a facility along a minor street can be hardly selected as a departure place. In this case, for example, the storage unit 21 of the server 20 stores a road type, such as a municipal road, a prefectural road, or a national road, the number of lanes, a road width, and the like in advance in association with roads between a plurality of nodes as intersections. For example, the selection unit 24 may determine that a road whose road type is a prefectural road or a national road, a road where the number of lanes is two or more, and a road where the road width is equal to or greater than a predetermined value is a principal road. For example, in a case where a position of a facility is within a predetermined range from a principal road, the selection unit 24 may determine that the facility is along the principal road.

Subsequently, the selection unit 24 increases the score to the processing target facility when a predicted needed time from the processing target facility to the destination is closer to a needed time or a predicted needed time of the original route (Step S110). With this, temporal change with the change of the departure place can be made smaller.

Subsequently, the selection unit 24 determines whether or not there is a facility not selected as a processing target among the facilities searched in Step S101 (Step S111).

In a case where there is an unselected facility (in Step S111, YES), the process progresses to Step S102.

In a case where there is no unselected facility (in Step S111, NO), the selection unit 24 selects a facility having the highest score to the processing target facility among the facilities searched in Step S101 as the second departure place (Step S112), and ends the process. The selection unit 24 may present a predetermined number of facilities in a descending order of the score of the processing target facility as candidates to the terminal 10, and may select a facility selected from the user of the terminal 10 as the second departure place.

Use of Shared Route

Processing using the route information uploaded by the terminal 10-1 as a sharing source in the route information sharing unit 13 of the terminal 10-2 as a sharing destination will be described referring to FIG. 9. FIG. 9 is a flowchart showing an example of processing using route information.

Hereinafter, although an example where a departure place is changed will be described, a destination can be changed in the same manner as described below. In this case, in the following description, a "departure place" and a "destination" may be appropriately replaced with each other. Also, in the example described below, both of the departure place and the destination may be changed.

In Step S201, the route information sharing unit 13 acquires the route information uploaded by the terminal 10-1 as a sharing source. Here, the route information sharing unit 13 may receive the route information from the SNS server 30 as in Step S12 of FIG. 4.

Furthermore, the route information sharing unit 13 may search for and acquire the route information according to conditions from the server 20. In this case, the route information may be acquired as follows. First, in a case where a search operation of the shared route with the departure place, the destination, and the like designated is received from the user, the route information sharing unit 13 of the terminal 10-2 transmits a search request to the server 20. Subsequently, for example, the sharing unit 25 of the server 20 searches for, among a plurality of pieces of uploaded route information, route information where a destination included in the route information substantially coincides with a destination designated from the user of the terminal 10-2 and a departure place included in the route information and a departure place input from the user are within a predetermined range, and transmits the searched route information to the terminal 10-2. With this, even a user other than the friends or the like of the user as a sharing source can use the uploaded route information. In addition, in this case, the sharing unit 25 of the server 20 may search for, among a plurality of pieces of uploaded route information, route information where the attributes of the age and sex of the user as a sharing source, and a vehicle type, such as a light vehicle or a heavy vehicle, included in the route information coincide with the attributes of the user of the terminal 10-2 as a sharing destination. With this, for example, it is possible to search for route information where the vehicle passes through a popular via-point in attributes of a specific user or route information where the vehicle does not pass through a secluded road having a narrow road width in a case where the vehicle of the user is a heavy vehicle.

Subsequently, the route information sharing unit 13 displays the acquired route information (Step S202). Here, the screen shown in FIG. 6 is displayed.

Subsequently, the route information sharing unit 13 determines whether or not to change the departure place (Step S203). Here, the route information sharing unit 13 may determine whether or not to change the departure place, for example, based on an operation from the user.

In a case where determination is made not to change the departure place (in Step S203, NO), the process progresses to Step S206. With this, the route information including the unchanged original departure place is shared.

In a case where determination is made to change the departure place (in Step S203, YES), the route information sharing unit 13 receives an operation to designate a departure place after change (Step S204). Here, for example, the departure place after change may be designated from a current place, home of the user registered in advance, a point registered in advance, a point pressed for a long time on a map screen, or the like. The route information sharing unit 13 may designate a point set in advance by the user as the departure place after change.

Subsequently, the route information sharing unit 13 makes the route guidance controller 23 of the server 20 search for a route from the departure place after change to the destination (Step S205). Subsequently, the route information sharing unit 13 makes the predicted arrival time or the like be calculated with the current time as the departure time (Step S206).

Subsequently, the route information sharing unit 13 executes route guidance (Step S207), and ends the process. With this, the user can receive a service of guidance of a route from home or the like to a predetermined destination or a route from a predetermined departure place to home or the like using route information uploaded from another user.

SUMMARY

According to the above-described embodiment, after at least one of a departure place or a destination is changed to a position of a principal facility or the like, data of a route or the like is shared with other users. With this, it is possible to restrain the position of home or the like from being shared as a departure place or a destination.

A route along which the vehicle will move from now or a route along which the vehicle is moving is shared, making it easy to join the friends or the like, for example. A route along which the vehicle has actually moved is shared, whereby a route along which the vehicle passes through a recommended via-point, a route along which the vehicle passes through a local secluded road hardly searched in car navigation or the like can be shared with another user.

Although the embodiment of the disclosure has been described above in detail, the disclosure is not limited to a specific embodiment described above, and various modifications and alterations may be made without departing from the spirit and scope of the disclosure described in the claims.

The functional units of the terminal 10 and the server 20 may be realized by, for example, cloud computing constituted of one or more computers. At least a part of the functions of the terminal 10 and the SNS server 30 may be provided in the server 20. At least a part of the functional units of the server 20 may be provided in the terminal 10.

In the embodiment of the disclosure, the server 20 is an example of an information processing apparatus.

What is claimed is:

1. An information processing apparatus comprising a central processing unit (CPU), the CPU being programmed to:
   acquire first route information of a first departure place to a first destination, a first user moving from the first departure place to the first destination;
   select at least one of a second departure place within a first predetermined range from the first departure place and a second destination within a second predetermined range from the first destination;
   enable sharing of second route information of at least one of the second departure place to the first destination and the first departure place to the second destination with a second user different from the first user; and
   execute at least one of
      selecting, as the second departure place, a facility within the first predetermined range from the first departure place, and
      selecting, as the second destination, a facility within the second predetermined range from the first destination.

2. The information processing apparatus according to claim 1, wherein the CPU is further programmed to execute at least one of
   selecting, as the second departure place, a facility along a principal road among at least one facility within the first predetermined range from the first departure place with priority, and
   selecting, as the second destination, a facility along a principal road among at least one facility within the second predetermined range from the first destination with priority.

3. The information processing apparatus according to claim 1, wherein the CPU is further programmed to include, in the second route information, at least one of (i) a departure time of the second departure place calculated according to an arrival time of the first destination included in the first route information and (ii) an arrival time of the second destination calculated according to a departure time of the first departure place included in the first route information.

4. The information processing apparatus according to claim 1, wherein the CPU is further programmed to:

in a case where sharing of the first route information is permitted by the first user, set the first route information to be usable to the second user, and in a case where sharing of the first route information is not permitted by the first user, share the second route information with the second user.

5. The information processing apparatus according to claim 1, wherein the CPU is further programmed to share the second route information with the second user selected by the first user.

6. The information processing apparatus according to claim 1, wherein the CPU is further programmed to make the second route information be shared between the first user and the second user by using a social networking service.

7. The information processing apparatus according to claim 1, wherein the CPU is further programmed to change at least one of the second departure place and the second destination, the second departure place and the second destination being included in the second route information, to a position according to the second user, and share the position with the second user.

8. An information processing method comprising:

by an information processing system, acquiring first route information of a first departure place to a first destination, a first user moving from the first departure place to the first destination;

selecting at least one of a second departure place within a first predetermined range from the first departure place and a second destination within a second predetermined range from the first destination;

enabling sharing of second route information of at least one of the second departure place to the first destination and the first departure place to the second destination with a second user different from the first user; and executing at least one of selecting, as the second departure place, a facility within the first predetermined range from the first departure place, and selecting, as the second destination, a facility within the second predetermined range from the first destination.

9. An information processing system comprising:

a first terminal configured to transmit first route information of a first departure place to a first destination, a first user moving from the first departure place to the first destination, to an information processing apparatus;

the information processing apparatus including a central processing unit (CPU), the CPU being programmed to:

acquire first route information of the first departure place to the first destination, along which the first user moves, select at least one of a second departure place within a first predetermined range from the first departure place and a second destination within a second predetermined range from the first destination, enable sharing of second route information of at least one of the second departure place to the first destination and the first departure place to the second destination with a second user different from the first user, and execute at least one of selecting, as the second departure place, a facility within the first predetermined range from the first departure place, and selecting, as the second destination, a facility within the second predetermined range from the first destination; and a second terminal configured to acquire the second route information.

10. A non-transitory storage medium storing a program causing an information processing system to execute:

acquiring first route information of a first departure place to a first destination, a first user moving from the first departure place to the first destination;

selecting at least one of a second departure place within a first predetermined range from the first departure place and a second destination within a second predetermined range from the first destination;

enabling sharing of second route information of at least one of the second departure place to the first destination and the first departure place to the second destination with a second user different from the first user; and executing at least one of selecting, as the second departure place, a facility within the first predetermined range from the first departure place, and selecting, as the second destination, a facility within the second predetermined range from the first destination.

* * * * *